T. C. WALKER, Jr.
FLEXIBLE FLANGE FRICTION CLUTCH BELT PULLEY.
APPLICATION FILED OCT. 1, 1920.
1,390,406.
Patented Sept. 13, 1921.
2 SHEETS—SHEET 1.
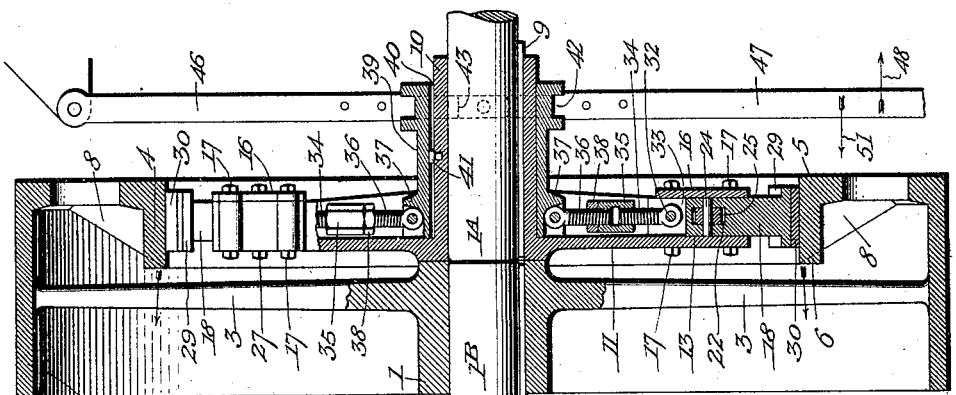
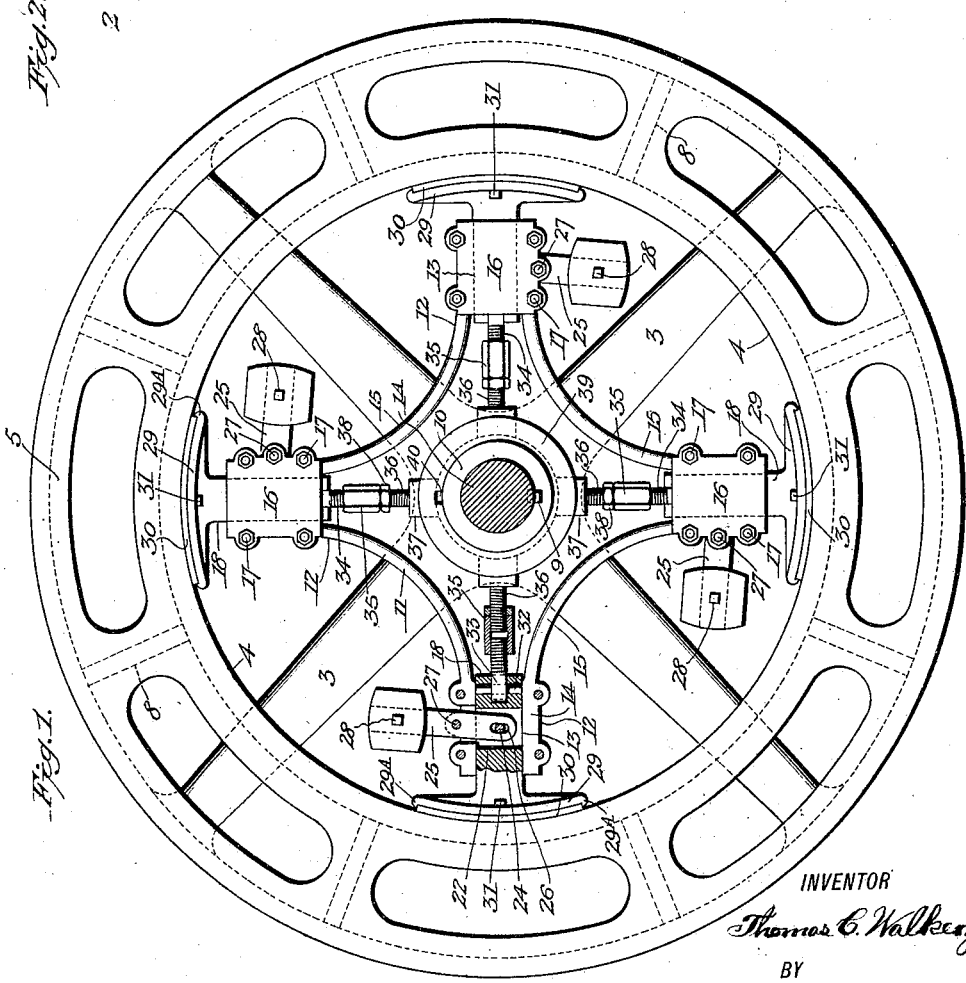
INVENTOR
Thomas C. Walker Jr.
BY
H. S. Bailey   ATTORNEY T. C. WALKER, Jr.
FLEXIBLE FLANGE FRICTION CLUTCH BELT PULLEY.
APPLICATION FILED OCT. 1, 1920.
1,390,406.
Patented Sept. 13, 1921.
2 SHEETS—SHEET 2.
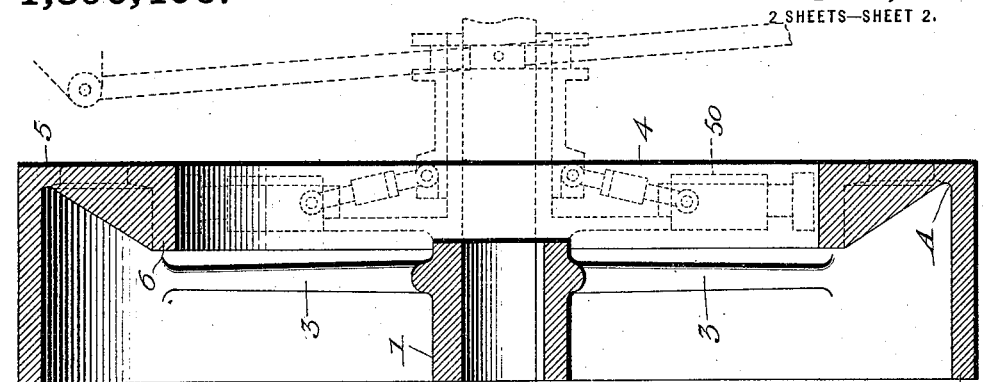
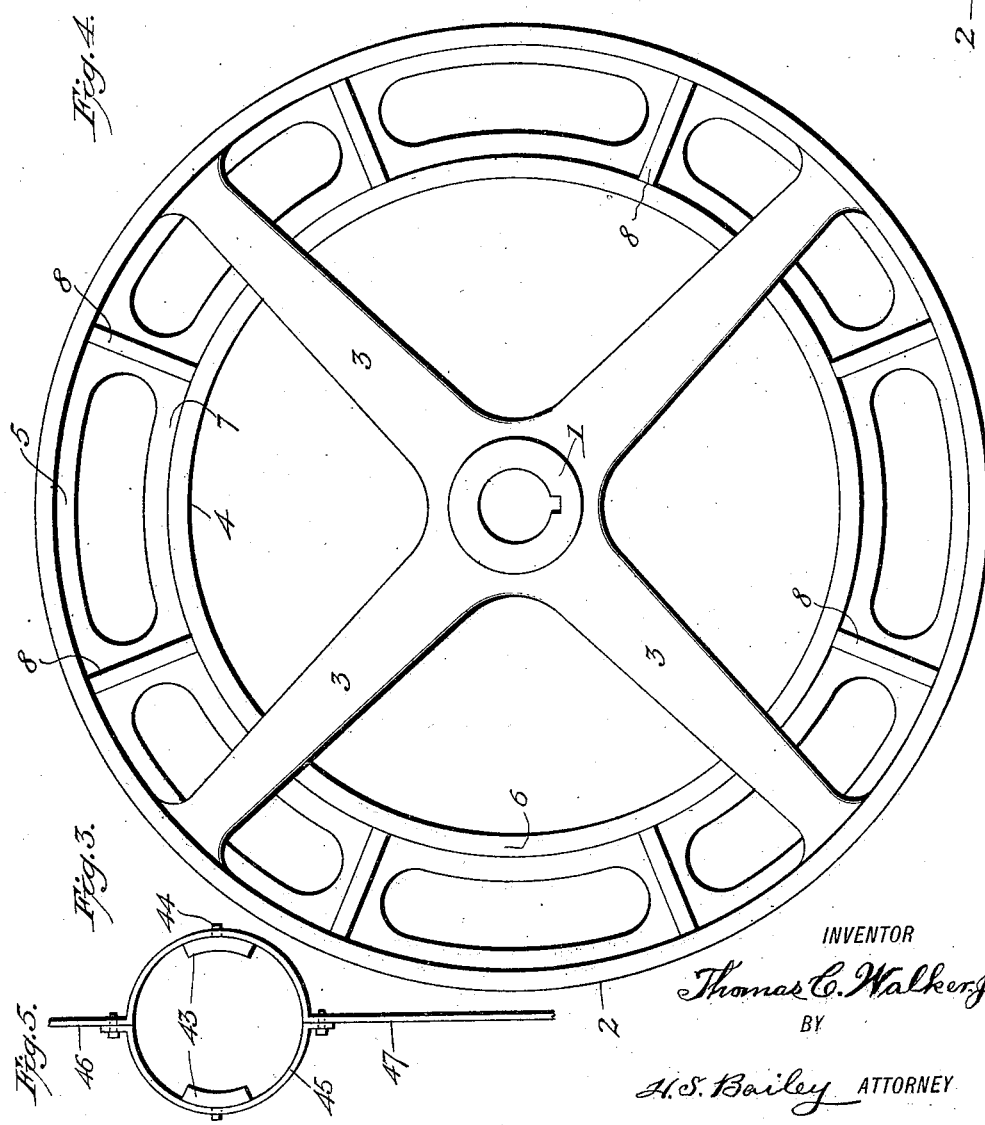
INVENTOR
Thomas C. Walker, Jr.
BY
H. S. Bailey ATTORNEY

UNITED STATES PATENT OFFICE.

THOMAS C. WALKER, JR., OF DENVER, COLORADO.

FLEXIBLE-FLANGE FRICTION-CLUTCH BELT-PULLEY.

1,390,406. Specification of Letters Patent. Patented Sept. 13, 1921.

Application filed October 1, 1920. Serial No. 414,042.

*To all whom it may concern:*

Be it known that I, THOMAS C. WALKER, Jr., a citizen of the United States of America, residing at the city and county of Denver, and State of Colorado, have invented a new and useful Flexible-Flange Friction-Clutch Belt-Pulley, of which the following is a specification.

My invention relates to a new combined flexible flange friction clutch belt pulley, and the objects of my invention are:

First: To provide a friction clutch belt driving pulley that is provided with a friction clutch shoe engaging flange and ring portion that will yield to the sudden pressure of the clutch shoes and that will throw off the heat rapidly enough to prevent the cracking or breaking of any part of the pulley.

Second: To provide a simple thoroughly practical positive friction clutch belt pulley, the belt rim and the shoe engaging flange of which will pick up any load for which it is made, from a dead stop and carry it to its full running speed in a few seconds of time, without any danger of injury to the pulley from the sudden shock of the clutch or the heat developed by its impact with the pulley.

I attain these objects by the mechanism illustrated in the accompanying drawings, in which:

Figure 1 is a side elevation of a flexible flange friction clutch belt pulley constructed in accordance with my invention, a clutch coupler being shown in connection therewith.

Fig. 2 is a vertical sectional view of Fig. 1.

Fig. 3 is a reverse side elevation of the pulley from that shown in Fig. 1, the clutch coupler being omitted.

Fig. 4 is a vertical sectional view of Fig. 3, the clutch coupler being shown in dotted lines, and in uncoupled position, and Fig. 5 is a front view of a portion of the clutch-shifting lever.

Similar letters of reference refer to similar parts throughout the several views.

Referring to the drawings:

The numeral 1 designates the hub portion of a belt pulley; 2, the rim portion; 3, the spokes, and 4, the flexible flange portion of a new type of a belt pulley which I have found in practice is essential in its coöperative features to operate under all conditions of varying heavy loads when built in coöperative combination with my friction clutch coupling, which was patented to me October 6, 1903, No. 740,719. In the construction illustrated in that patent, that is, that part of it that relates to the pulley, and in particular, to the rim portion of the pulley, it was found that the rim, under heavy loads that had to be picked up quickly, would spring away from the shoes 30, of the friction clutch; for instance, when a load that normally required only about twenty horse power to keep it running smoothly and evenly after it had been picked up and had attained its regular speed, of say, one hundred and fifty revolutions per minute, was shut down and had to be picked up in a few seconds of time, which would require over a hundred horse power frictional contact of the shoes on the inner periphery of the rim of the pulley, the rim would spring away from the shoes of the clutch between the spokes of the pulley and allow the clutch to slip, and this slipping movement of the clutch would heat the rim of the pulley up to such a degree that it would expand and break; and in the course of a large number of experiments extending over a number of years, the rims would crack, even if made considerably thicker and of various different shapes, than the proportion shown in the drawings of my former patent, from the unequal expansion caused by the heat of the shoes against the inner periphery of the rim of the pulley.

I have however, quite recently perfected a new type of pulley that coöperatively acts with the action of the shoes of my friction clutch and at the same time acts by itself and within itself responsively to the outward pressure of the shoes against the rim, and also to the heat developed by the shoes before they first finally lock themselves to the rim of the pulley after they have picked a load up to speed enough to hold it and carry it to the peak of the speed it is to run at and keep it there.

For instance, supposing a ball mill for grinding ore has ten tons of ore in it and that the balls weigh five tons and the mill is at a standstill and has got to be started and brought to full speed in a few seconds of time, now inasmuch as this great weight, about fifteen tons, is packed down and the ore is almost always wet, it requires an immense horse power suddenly applied to bring such an unbalanced load up to its regular speed from a dead stop, and in the form of rim shown in my above mentioned patent, it required a much longer time than it ought to, and frequently the rims would crack from the sudden and unequal expansion caused by the heat which would develop to a high temperature at and immediately adjacent to the inner periphery of the rim, before the outer circumferential surface of the rim got heated up quick enough to prevent it from cracking.

My present perfected flexible flange belt pulley, however, completely overcomes all of this trouble, and I can pick up the load in a few seconds of time from a dead stop, and carry it to its full speed in a few seconds.

The flexible flange portion of my new type of pulley consists of a depending flat web form of flange 5, through which at short distances apart elongated apertures are made, the top and bottom lines of which are concentric with the rotating axis of the pulley. This web depends substantially vertically from one of the side edges of the rim of the pulley and it terminates in a horizontally positioned ring member 6, the inner face of which is machined concentric to the axis of the pulley, and is wide enough to be engaged by the whole width of the shoes 30 therefor.

This ring portion projects inwardly from the face 7, of the web underneath and normally parallel with the belt rim and toward its opposite end, and from its inner end lugs 8, extend upwardly but at a sharp angle to the belt rim at its junction with the web, the lugs and the rim at this point being arranged to form a sharp square corner. This sharp square corner at the junction of these lugs with the web edge of the belt rim forms a very essential feature of my invention, inasmuch as it is a fulcruming point on which the ring and its web spring with a flexible movement, under the sudden and great pressure of the shoes of the friction clutch when thrown in engagement with its inner peripheral face, as will be fully explained hereinafter.

The friction clutch is mounted on a shaft 1ᴬ, that is the driver-shaft of a line of shafting that is not shown; and the belt pulley is mounted on a shaft 1ᴮ that is the driven-shaft; that is a shaft that is to be driven with and by the belt pulley. Both of these shafts are journaled in bearings that are not shown, and upon the end of the driver-shaft I secure by a key 9, a long hub 10, which is positioned close up against the hub of the belt pulley. The hub 10 is provided with a spider 11, which consists of a flange-body portion that radiates from the hub and terminates in preferably four arms 12, in the ends of which a box-shaped slideway 13, is formed by laterally projecting oppositely-arranged sides 14, that emerge into ribs 15, and extend around the peripheral edges of the flange portion of the spider, and a cover 16, that is removably secured to the terminal ends and the sides of the arms 13 by bolts 17. In the box formed at the ends of the arms by the cover and sides of the arms I slidably mount a jaw 18, which consists of a rectangular-shaped shank having an enlarged jaw at its outer end. The shank of the jaw projects beyond the slideway of the box at both ends, and a transverse slot 22 is formed through the shank of the jaw in that portion of its length that stands normally centrally of the length of the box, and a slot is formed through one of the sides of the box opposite the slot 22 in the shank of the jaw. I extend a pin 24 through the shank and its slot. A lever 25 extends through the slot in the box, also into the slot in the recess of the shank of the jaw, and is pivotally mounted on the pin 24, by means of an oblong hole 26, formed in its end, through which the pin passes. The lever 25, is also pivotally secured to the edge of the box by a bolt 27. Upon the free end of the lever I secure a weight by a pin 28.

The jaw is provided with a curved face that is concentric to the inner periphery of the flexible flange ring 6, and is provided with upwardly projecting lugs 29, at its opposite ends, and a shoe 30, which may be constructed of any suitable material, is fitted against the jaw between the edges 29ᴬ, and secured thereto by bolts 31, or any suitable means which extend into the shoe from the bottom of the jaw. The lower end of the shank of the jaw is pivotally secured by a pin 32, to an eye 33, formed in one end of a right-hand-threaded eyebolt 34, the opposite end of which is threaded to a nut 35, which is provided with a counter-bored chamber centrally of its length, at the end of the right-hand thread, of larger diameter than the thread. The opposite end of the nut is provided with a left-hand thread, that also extends to the chamber in which is threaded one end of a left-hand-threaded eyebolt 36, the opposite end of which contains an eyehole and is pivotally secured to the lugs 37. A check-nut 38, is placed on the rod 36, and screws against the nut 35. The lugs 37 form an integral part of a sleeve 39, which I term a "clutch-sleeve". This sleeve is slidably mounted on the hub of the spider and has preferably four sets of lugs—one set at each quarter of its circumference—to which are pivotally secured the four adjustable eyebolts 34 and 36, that connect this clutch-sleeve to the jaws 18, in the boxes of the arms of the spider. This clutch-sleeve is provided with a keyway 40, that extends axially through it, and a key 41, is secured to the hub of the spider. I preferably use as a key a machine-screw, which I thread into the hub of the spider at a point about centrally of the length of the sleeve, so that its head will project loosely into the keyway. The clutch-sleeve is thus feathered to slide axially on the hub of the spider and is prevented from turning on it by the key. It is thus always held in operative alinement with the jaw-adjusting rods. The outer end of the clutch-sleeve is provided with a circumferential groove 42, which I term a "shipper groove", in which I fit loosely and slidably two segmental shipper-shoes 43, which I preferably make of anti-friction metal. These shoes are provided with trunnions 44, which fit into opposite sides of a shipping-ring 45, that fits loosely over the clutch-sleeve, thus securing the shoes on opposite sides of the shipper-slot from the opposite sides of the shipper-ring. From the trunnion-bearings two levers 46 and 47, extend in opposite directions. The lever 46, is pivotally secured at its end to any suitable support from which the shipper-lever 47 depends within reach of an operator.

The operation of my improved friction-clutch coupler is as follows: The clutch is rotated by the driving-shaft and is shown in Figs. 1 and 2 in operative clutch-gripping relation to the clutch flexible flange ring 6, and to release the jaws of the clutch from the ring 6, it is only necessary to move the shipper-lever 47, in the direction of the arrow 48, which movement will slide the clutch-sleeve on the hub of the spider and move the lower ends of all the adjustable rods with it, thus moving the jaws away from the ring 6, and releasing the clutch. The adjusting rods then stand at an angle to the jaws, as shown by the dotted line 50. In order to operate the clutch to grip the ring 6, the shipper-lever is moved in the direction of the arrow 51. This straightens the adjusting-rods up so that their centers stand at right angles to the axis of the shaft and sleeve and in a straight line underneath the jaws, so that their pivotal centers are in right-angled alinement to the axis of the shafts, in which position the jaws are locked tight against the inner periphery of the ring 6, the adjusting-rods being lengthened or shortened by the right and left hand nut, so that the jaws bear tightly against the ring 6, when the sleeve and rods are thrown into operative clutching position.

As the clutch generally rotates at a high rotative speed, the centrifugal force exerted in the jaws is considerable and tends to cause the jaws and shoes to creep into operative engagement with the ring 6, when they are uncoupled from it and to cause them to cling to it and resist being uncoupled when the shipper is moved to uncouple them. This centrifugal action exerted upon the jaws is, however, entirely overcome by the weighted arms 25, which when the jaws are released and drawn inward, are swung on their pivot bolts 27, by means of the pins 24, which extend through the inner ends of the arms, and through the shanks of the jaws, their outer weighted ends being moved outward toward the ring 6, and these weighted ends of the arms 25, are held in this position by centrifugal force, thus preventing the jaws from being unintentionally thrown outward by the same centrifugal force, and consequently preventing the shoes from engaging the ring 6.

The pressure of the shoes against the inner peripheral face of the flexible flange ring 6, is very great when the clutch is thrown and the belt pulley is belted to a very heavy load, like an ore grinding mill would be or any other machine that requires the application of several times as much power to start it as it does to run it steadily after it has gotten under full operative speed, and when the shoes of my friction clutch are thrown tightly against the flexible flange ring 6, it yields and springingly moves inwardly, swinging or tilting inwardly slightly in the direction of the arrow, pivotally moving around on its fulcruming point, at the junction of the web 5, and the upper terminal end portions A, of the lugs with the belt-rim, until it stands approximately at the angle shown in Fig. 2, and the shoes owing to their being loosely mounted in the box that is formed in the ends of the arms by the cover 16, and the side 14, of the arms, yield laterally enough to follow and keep in full bearing contact and with its full pressure on the full width of the ring.

The shoe engaging ring and the flange and the ring bracing lugs heat up to a degree of heat that prevents the hand from being laid on the flange portion of the pulley, but only a little of this heat gets to the corner A, of the angle between the flange and the rim of the pulley. Owing to the very open-apertured construction of the flange and the progressively decreasing amount of the material in the lugs from the inner edge of the shoe engaging ring 6, to the corner A, of the side flange and of the belt receiving rim of the pulley, the heat very rapidly radiates from the ring and from the lugs and from the flange, and within a very few minutes of the time that the clutch and the pulley has picked up its load, the flange and the ring and the lugs have cooled off.

My invention provides a combined friction clutch belt driving pulley, that is so constructed and arranged that it receives the shock and furious gripping and grinding action of the shoes of the friction clutch by a relief movement of its shoe engaging ring, which also, owing to its construction and arrangement, throws off the suddenly developed heat fast enough to prevent the flexible flange or the rim or the ring or the lugs from cracking.

Having described my invention, what I claim as new and desire to secure by Letters Patent, is:

1. A flexible flange clutch gripping pulley, comprising a pulley having a belt receiving rim, and a flange member arranged to be engaged by a friction clutch member, and to yieldingly spring under the pressure thereof, said flange projecting downward from said rim and provided with a series of apertures, and a ring on the end of said flange against which said clutch bears.

2. In a flexible flange clutch pulley, the combination of a driving friction clutch member and its driving shaft, with a pulley having a belt receiving rim, and a flange member arranged to be engaged by said friction clutch member, said flange projecting downward from said rim, and provided with a series of apertures, and a ring on the end of said flange against which said clutch member bears, and an angular shaped rib between each two apertures in said flange, extending from the edge of said ring to the junction of the flexible flange with the belt receiving rim of said pulley.

3. In a flexible flange clutch pulley, the combination of a driving friction clutch member and its driving shaft, with a pulley having a belt receiving rim, and a flange member arranged to be engaged by said friction clutch member, said flange projecting downward from said rim, and provided with a series of apertures, and a ring on the end of said flange against which said clutch bears, and an angular shaped rib between each two apertures in said flange, extending from the edge of said ring to the junction of the flexible flange with the belt receiving rim of said pulley, said friction clutch member being provided with shoes that bear on the inner periphery of said ring, means for operating said member, and means for supporting said belt pulley at the side of and in power receiving relation to said friction clutch member.

4. A friction clutch pulley comprising a belt rim, an inner concentric clutch rim spaced from the outer rim, and connected around one edge with one edge of the outer rim by an integral open-work web, said clutch rim being of less width than the outer rim, said web having radial, equidistant integral brace ribs which are also integrally connected with the clutch rim, and slope from the free edge of the clutch rim to the point of junction of the web with the outer rim; an axial hub, and spokes connecting the same with the outer rim.

5. A friction clutch pulley, comprising a belt rim, an inner, concentric clutch rim, and an integral annular web connecting one edge of the belt rim and one edge of the clutch rim, and formed with an endless series of openings; equi-distant radially disposed brace ribs, integrally connected to said web and said clutch rim between each two openings, said ribs being triangular in form, their bases being connected to the said clutch rim, and their apexes terminating at the point of junction of the web and the outer rim; a hub and spokes connecting the same with the outer rim.

In testimony whereof I affix my signature in presence of two witnesses.

THOS. C. WALKER, Jr.

Witnesses:
G. SARGENT ELLIOTT,
ELIZABETH SMITH.